(12) United States Patent  
Grabarnik et al.

(10) Patent No.: US 7,827,132 B2
(45) Date of Patent: Nov. 2, 2010

(54) PEER BASED EVENT CONVERSION

(75) Inventors: Genady Grabarnik, Scarsdale, NY (US); Chang-Shing Perng, Bedford Hills, NY (US); Abdolreza Salahshour, Raleigh, NC (US); Balan Subramanian, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 663 days.

(21) Appl. No.: 11/531,901

(22) Filed: Sep. 14, 2006

(65) Prior Publication Data

US 2008/0082473 A1  Apr. 3, 2008

(51) Int. Cl.
G06E 1/00 (2006.01)
G06E 3/00 (2006.01)

(52) U.S. Cl. .................. 706/48; 370/328; 709/224
(58) Field of Classification Search .......... 706/48; 370/328; 709/224
See application file for complete search history.

(56) References Cited

U.S. PATENT DOCUMENTS

| | | | |
|---|---|---|---|
| 6,009,463 A | 12/1999 | Brandt et al. | |
| 6,920,493 B1 | 7/2005 | Schwab | |
| 2002/0133568 A1* | 9/2002 | Smith et al. | 709/219 |
| 2002/0180777 A1 | 12/2002 | Kusumoto et al. | |
| 2004/0034618 A1 | 2/2004 | Lu et al. | |
| 2005/0097566 A1 | 5/2005 | Watts, Jr. et al. | |
| 2005/0174961 A1* | 8/2005 | Hrastar | 370/328 |
| 2008/0043976 A1* | 2/2008 | Maximo et al. | 379/220.01 |

OTHER PUBLICATIONS

Ito et al., "An Architecture of the Concurrent Production System CONPUS," Jan. 1997, IEEE, pp. 2091-2096.

* cited by examiner

*Primary Examiner*—Donald Sparks
*Assistant Examiner*—Kalpana Bharadwaj
(74) *Attorney, Agent, or Firm*—Jeanine S. Ray-Yarletts, Esq.; Steven M. Greenberg, Esq.; Carey Rodriguez Greenberg & Paul LLP

(57) ABSTRACT

A rule set to convert an event into a standardized format can be established based on cooperation among peer processing nodes. A processing node that receives the event takes the initial responsibility to convert the event. The responsible processing node initially attempts to convert the event using locally available rules. If the initial attempt fails, the responsible processing node will communicate the event to peer processing nodes and request them to provide conversion rules. Upon receipt of the rules provided by the peer processing nodes, the responsible processing node combines the received rules with the locally available rules to generate a rule set to convert the event. The responsible processing node may also transfer the event to another processing node for the other processing node to take the responsibility to convert the event.

24 Claims, 3 Drawing Sheets

PEER BASED EVENT CONVERSION

FIELD OF THE INVENTION

The invention relates generally to network system management, and more particularly to converting events of components within a network system to a standardized format.

BACKGROUND OF THE INVENTION

Complexity of the management of today's network of software and hardware offerings, also known as a solution, sets forth new challenges for solution management systems. By definition, solutions are collections of software and hardware components that are brought together to address customers' business requirements. The complexity of these solutions and the skills required to operate and maintain such systems require automation and management. Such automation and management requires mechanisms for the participating components to communicate their operation status to the solution manager. Current advents in computing systems provide mechanisms for software or hardware products to communicate different aspects of their operation status, for example, configuration, performance, resource consumption, and significant changes in their normal operation or environment, generally referred to as events. The data collected is vital to a management system intended to monitor, regulate and ensure continuous operation of a solution. Such data collection is even more critical for autonomic computing and automation.

One prevalent problem in a complex and heterogeneous solution is the diversity of the types and formats of messages generated by participating components. Different components of a solution may be developed by different teams without an integrated program design. As such, the messages are composed and formatted as they are perceived to be the best fit by the respective development teams. Commonly, management systems provide adapters or connectors capable of receiving and parsing data based on some predefined rules to convert the data into a common format. Problems arise in a high frequency transaction environment where high volume of incoming messages must be matched against every parsing rule, top-down or bottom-up order, to find the right match. This can be a long and time consuming process that commonly imposes bottle necks and performance implication. In a high frequency transaction environment, a mechanism is desired to reduce the time required to traverse the parsing rule in search of the right match.

Another disadvantage of the prior efforts is that in a high frequency transaction environment, especially a heterogeneous and dynamic transaction environment, knowledge required for converting an event to a common format for purposes of, e.g., correlation and analysis, may not be readily available at a processing node. In addition, even if the knowledge can be made available at all processing nodes, the performance overhead of traversing the body of knowledge at every processing node is too high to be feasible in a production setup as millions of events flow into a processing node every second.

Still a further disadvantage of the prior efforts is that the knowledge required to do a conversion may not even have been constructed for various reasons. This is particularly true for applications and business processes which contain multiple sub-components and sub-processes put together in a dynamic fashion on a particular processing mode.

Based on the above, it is preferable that rules for converting an event can be distributed among separate processing nodes, and a rule set for converting an event can be dynamically generated.

BRIEF SUMMARY OF THE INVENTION

A rule set to convert an event into a standardized format can be established based on cooperation among peer processing nodes. A processing node that receives the event takes the initial responsibility to convert the event. The responsible processing node initially attempts to convert the event using locally available rules. If the initial attempt fails, the responsible processing node will communicate the event to peer processing nodes and request them to provide conversion rules. Upon receipt of the rules provided by the peer processing nodes, the responsible processing node combines the received rules with the locally available rules to generate a rule set to convert the event. The responsible processing node may also transfer the event to another processing node for the other processing node to take the responsibility to convert the event.

A first aspect of the invention is directed to a method of converting an event into a standardized format by a processing node, the standardized format including at least one portion, the method comprising: receiving the event by a responsible processing node; processing the event to map a portion of the standardized format based on a rule retrieved locally within the responsible processing node; in case the locally retrieved rule is not sufficient to map the portion, communicating the event to a peer processing node for the peer processing node to provide a rule to map the portion; and combining a rule provided by the peer processing node and a rule locally retrieved to generate a rule set to convert the event into the standardized format.

A second aspect of the invention is directed to a computer program product for converting an event into a standardized format by a processing node, the standardized format including at least one portion, the computer program product comprising: computer usable program code, which when executed in a computer infrastructure, is configured to: receive the event by a responsible processing event; process the event to map a portion of the standardized format based on a rule retrieved locally within the responsible processing node; in case the locally retrieved rule is not sufficient to map the portion, communicate the event to a peer processing node for the peer processing node to provide a rule to map the portion; and combine a rule provided by the peer processing node and a rule locally retrieved to generate a rule set to convert the event into the standardized format.

A third aspect of the invention is directed to a method of generating a system for converting an event into a standardized format by a processing node, the standardized format including at least one portion, the method comprising: providing a computer infrastructure operable to: receive the event by a responsible processing event; process the event to map a portion of the standardized format based on a rule retrieved locally within the responsible processing node; in case the locally retrieved rule is not sufficient to map the portion, communicate the event to a peer processing node for the peer processing node to provide a rule to map the portion; and combine a rule provided by the peer processing node and a rule locally retrieved to generate a rule set to convert the event into the standardized format.

A fourth aspect of the invention provides a system for converting an event into a standardized format by a processing node, the standardized format including at least one portion, the system comprising: means for receiving the event by a responsible processing node; means for processing the event to map a portion of the standardized format based on a rule retrieved locally within the responsible processing node; in case the locally retrieved rule is not sufficient to map the portion, means for communicating the event to a peer processing node for the peer processing node to provide a rule to map the portion; and means for combining a rule provided by the peer processing node and a rule locally retrieved to generate a rule set to convert the event into the standardized format.

A fifth aspect of the invention provides a system for sharing knowledge among multiple event processing nodes in converting an event into a standardized format, the standardized format including at least one portion, the system comprising: means for communicating the event among multiple processing nodes for each of the multiple processing nodes to provide a rule to process the event to map a portion of the standardized format; and means for combining rules provided the multiple processing nodes to generate a rule set to convert the event into the standardized format and.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

The embodiments of this invention will be described in detail, with reference to the following figures, wherein.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

1. System Overview

Figure 1:
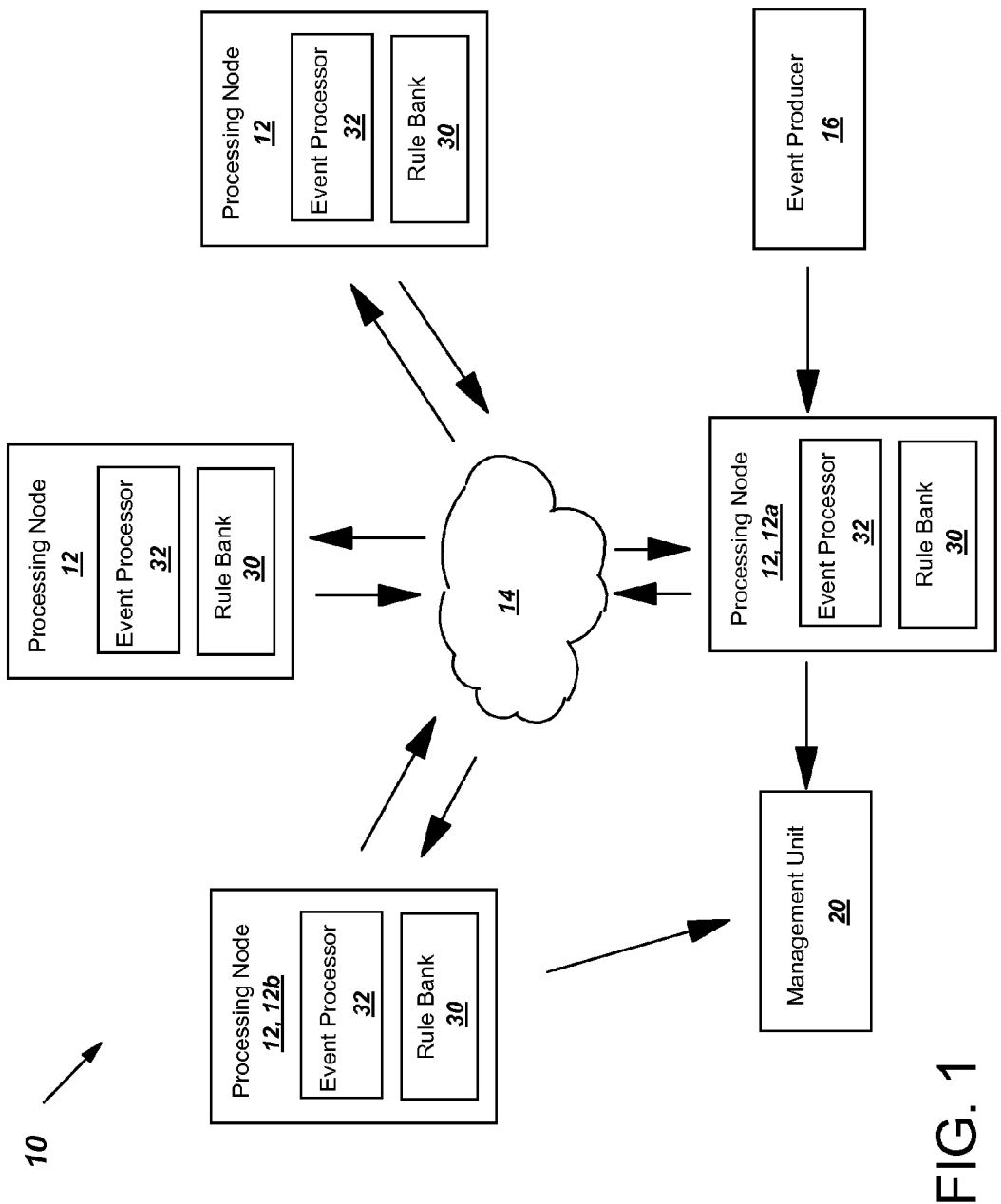
FIG. 1 shows a block diagram of an event processing system according to an embodiment of the invention.

FIG. 1 shows a block diagram of an event processing system 10 according to an embodiment of the invention. As shown in FIG. 1, event processing system 10 includes multiple processing nodes 12 communicating with one another through communication network 14. A processing node 12 may be coupled to at least one event producer 16 (only one event producer 16 is shown for simplicity purpose) in that event producer 16 communicates an event to the respective processing node 12. Processing nodes 12 function to process an incoming event and convert the event into a standardized format. It should be appreciated that a processing node 12 may be coupled/communicate to any number of event producers 16 or may be coupled to no event producer 16, and all are included in the scope of the invention. For example, in the case that a processing node 12 is not coupled to event producer 16, the processing node 12 may function as a donor processing node 12 such that it only receives and processes events transferred from other processing nodes 12, or may only provide rules for other processing nodes 12 to process an event, as will be described later. Processing nodes 12 are responsive to management unit 20 in that, e.g., processing nodes 12 communicate the processed and converted event to management unit 20. In the following description, an event communicated from event producer 16 will be referred to as an original event; and an event generated by a processing node 12 through processing an original event will be referred to as a standardized event.

As used in the description, an event producer 16 may include any software, hardware or human-being components within a network system. An event may include any communication to management unit 20 regarding any aspect of an event producer 16 including, e.g., configuration, performance, resource consumption, change in operation status or environment. The events may be human understandable or machine readable. As should be appreciated, the scope of the current invention is not limited by the specific types of event producers 16 and types of events. It should be appreciated that a processing node 12, the respective event producers 16, and other processing nodes 12 may be located in a single physical location, or may be located in separate locations. Network 14 may include any remote or local (in-site) communication means.

Each processing node 12 includes a rule bank 30 and an event processor 32. Event processor 32 and rule bank 30 communicate with one another in that event processor 32 relies, at least partially, on rules stored in rule bank 30 to process an event, and event processor 32 may also add more rules into rule bank 30. For example, in the case in which an event processor 32 of a processing node 12 (e.g., 12a) receives rules from other processing nodes 12 (e.g., 12b) in processing an event, as will be described later, the rules received may be stored in rule bank 30. In the following description, regarding a specific processing node 12 (e.g., 12a), a rule stored in rule bank 30 within the processing node 12 will be referred to as a local rule (or a locally retrieved rule), and a rule from another processing node 12 will be referred to as a peer rule, for illustrative purposes.

In operation, a processing node 12 that receives an original event from a respective event producer 16 takes the initial responsibility to convert the original event into a standardized format (standardized event). The responsible processing node 12 initially attempts to convert the original event using local rules. If the initial attempt fails, i.e., local rules are not sufficient to convert the event, the responsible processing node 12 will communicate the original event to other processing nodes 12, e.g., peer processing nodes 12, and request them to provide conversion rules. Upon receipt of the rules provided by other processing nodes 12, the responsible processing node 12 combines the received rules with the locally available rules to generate a rule set to convert the event. The responsible processing node 12 may also transfer the event to another processing node 12 for the other processing node 12 to take the responsibility to convert the event. When the other processing node 12 accepts the event, it in-turn becomes a responsible processing node and the original responsible processing node 12 becomes a peer processing node. As used in the description, a responsible processing node 12 is a processing node 12 that takes the responsibility to convert an original event, and a peer processing node 12 is a processing node 12 that a responsible processing node 12 takes as a peer to potentially cooperate with in converting the original event.

As should be appreciated, a responsible processing node 12 and a peer processing node 12 are relative to each other with respect to a specific event. For example, a responsible processing node 12 for one event may be a peer processing node regarding another event.

Details of event processor 32 of a processing node 12 will be described in detail below.

2. Event Processor

Figure 2:
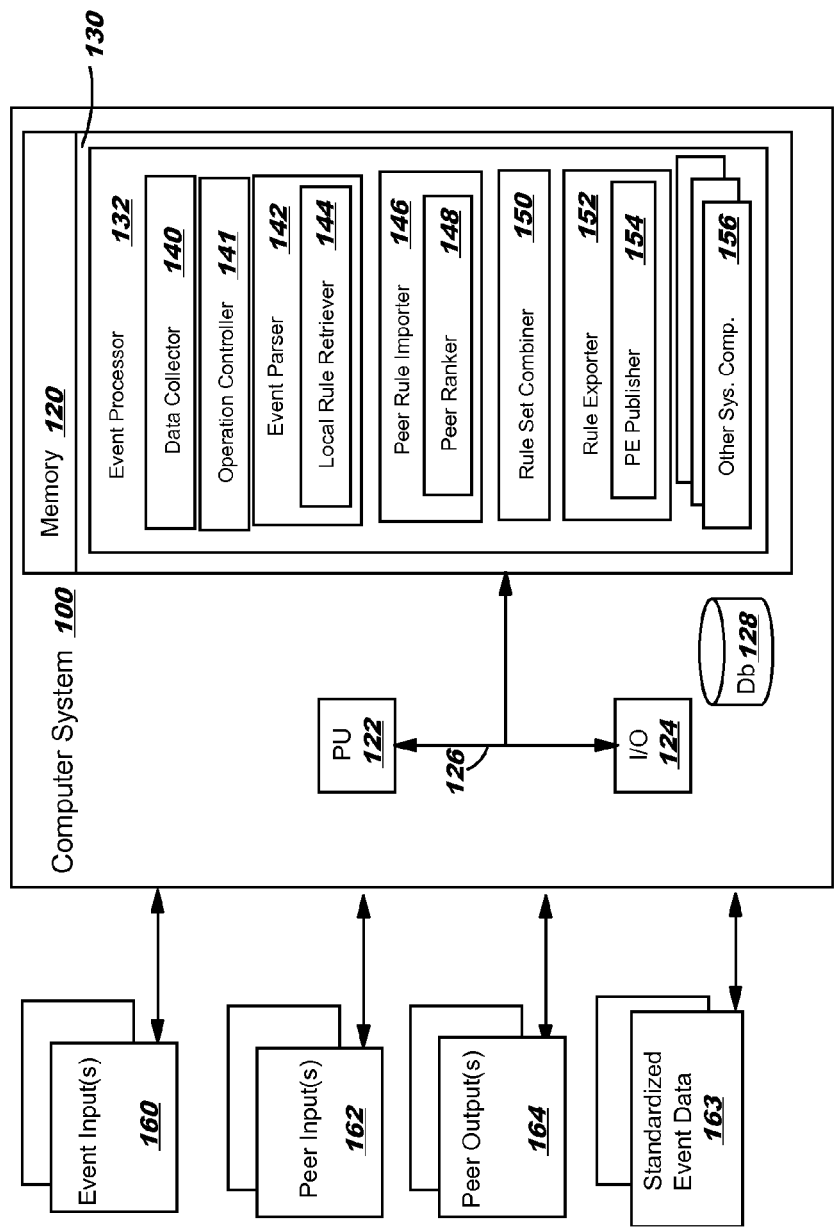
FIG. 2 shows a block diagram of an illustrative computer system, according to an embodiment of the invention

According to an embodiment, event processor 32, or part of event processor 32, may be effected by/within a computer system 100. Referring to FIG. 2, a block diagram of an illustrative computer system 100 is shown. In an illustrative embodiment, computer system 100 includes a memory 120, a processing unit (PU) 122, input/output devices (I/O) 124 and a bus 126. A database 128 may also be provided for storage of data relative to processing tasks. Memory 120 includes a program product 130 that, when executed by PU 122, comprises various functional capabilities described in further detail below. Memory 120 (and database 128) may comprise any known type of data storage system and/or transmission media, including magnetic media, optical media, random access memory (RAM), read only memory (ROM), a data target, etc. Moreover, memory 120 (and database 128) may reside at a single physical location comprising one or more types of data storage, or be distributed across a plurality of physical systems. PU 122 may likewise comprise a single processing unit, or a plurality of processing units distributed across one or more locations. I/O 124 may comprise any known type of input/output device including a network system, modem, keyboard, mouse, scanner, voice recognition system, CRT, printer, disc drives, etc. Additional components, such as cache memory, communication systems, system software, etc., may also be incorporated into computer system 100.

As shown in FIG. 2, program product 130 may include event processor 132 (used to effect event processor 32 of FIG. 1) that includes a data collector 140; an operation controller 141; an event parser 142 including a local rule retriever 144; a peer rule importer 146 including a peer ranker 148; a rule set combiner 150; a rule exporter 152 including a processing experience (PE) publisher 154; and other system components 156. Other system components 156 may include any now known or later developed parts of a computer system 100 not individually delineated herein, but understood by those skilled in the art.

Inputs to computer system 100 include event inputs 160 and peer inputs 162. Peer inputs 162 may include information communicated from a peer processing node 12 (FIG. 1), e.g., rules for processing an original event originally received and processed by a responsible processing node 12. Outputs from computer system 100 may include standardized event data 163 and peer outputs 164. Peer outputs 164 may includes information communicated to a peer processing node 12 (FIG. 1), e.g., rules for processing an original event originally processed by the peer processing node 12. The operation of event processor 132 will be described in detail below.

3. Operation

Event processor 132 functions generally to generate a rule set to convert an event into a standardized format to be, e.g., communicated to and read by management unit 20 (FIG. 1). According to an embodiment, as usually, a standardized format for an event may include multiple portions to represent different part/type of information contained in the standardized format. The portions of a standardized format may be organized as a hierarchical structure and each leaf of the hierarchical structure represents a portion. As such, rules for processing an event may also be grouped for each leaf (portion) of the standardized format. Within each group of rules for a specific portion of the standardized format, there may be multiple rules for different types of events. All the groups of rules for portions of the standardized format form a rule base within rule bank 30 of a processing node 12 (FIG. 1). It should be appreciated that the scope of the invention is not limited by the specific manner for organizing portions of a standardized format.

Figure 3:
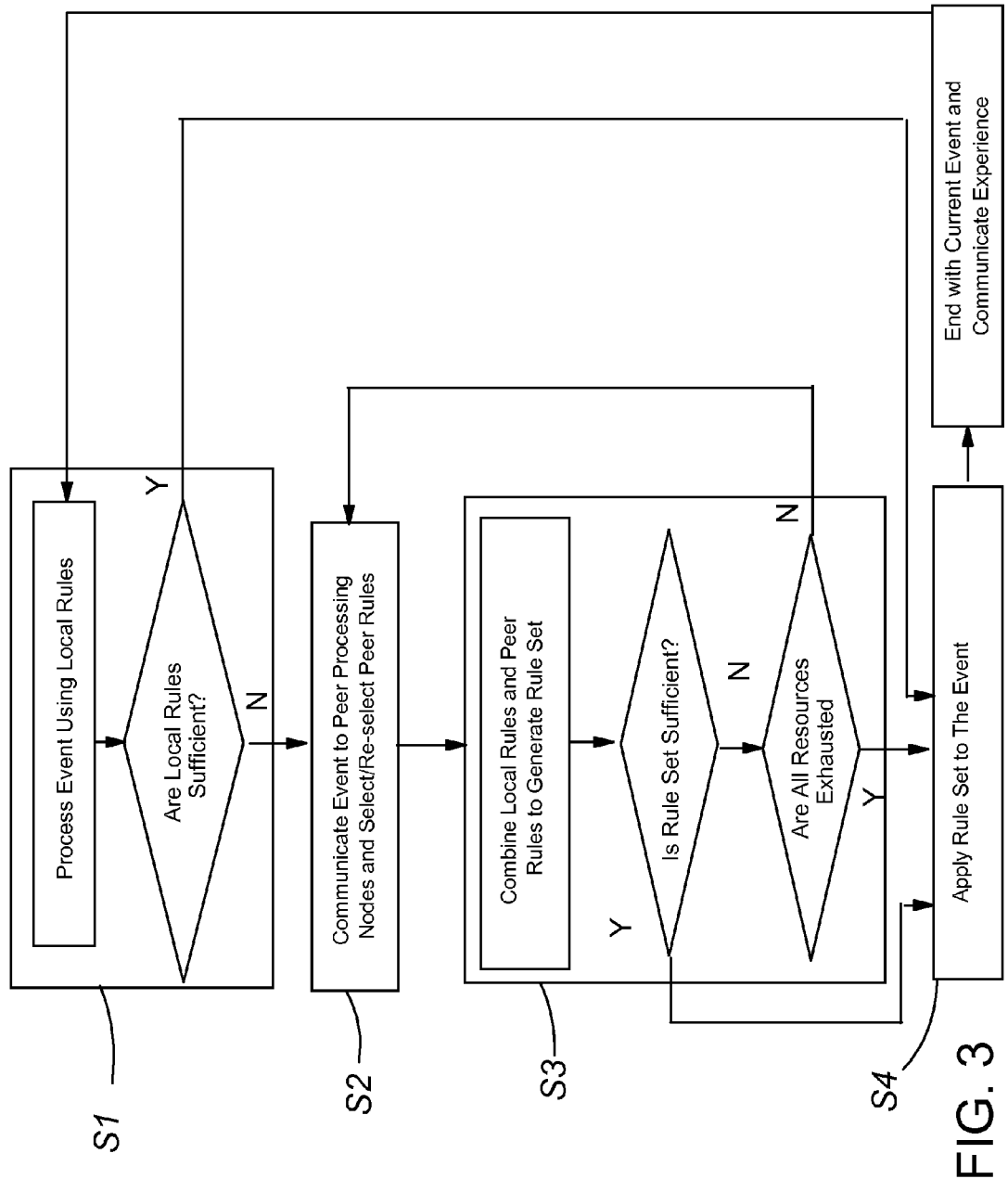
FIG. 3 shows a flow diagram of an operation of an event processor according to an embodiment of the invention.

FIG. 3 shows a flow diagram of an operation of event processor 132 according to an embodiment of the invention. In the following description, the operation of event processor 132 within one responsible processing node 12, e.g., 12a (FIG. 1) regarding one original event will be shown for illustration. It should be appreciated that multiple processing nodes 12 may take responsibility to process multiple events, and the multiple responsible processing nodes may communicate among one another regarding rules and events simultaneously.

Referring to FIGS. 2-3, according to an embodiment, an original event (or event for simplicity) produced by event producer 16 may be communicated to a responsible processing node 12, e.g., 12a, and will be received by data collector 140, which triggers an operation of event processor 132.

First in step S1, event parser 142 processes the event to map a portion(s) of a standardized format based on a rule/rules locally retrieved from the respective local rule bank 30 (FIG. 1). According to an embodiment, the processing/mapping operation may include extracting information (portions of information) from an original event and map the extracted information to fill portions of the standardized format. It should be appreciated that in the current invention, the processing and mapping operation may use any methods for extracting information and filling/mapping the extracted information to portions of the standardized format. According to an embodiment, event parser 142 controls local rule retriever 144 to retrieve proper rules from local rule bank 30 (FIG. 1). Event parser 142 then uses the locally retrieved rules to process the event and/or map the processed event onto the portions of the standardized format. In the following description, an event in a standardized format will be referred to as a configuration, for illustrative and simplicity purposes. Similarly, a portion or portions of the standardized format (configuration) will be referred to as a partial configuration. According to an embodiment, in the parsing operation, event parser 142 may only determine/retrieve rules to process the original event to map onto the portions of the standardized format. Event parser 142 may choose not to actually generate the configuration/partial configuration. According to an alternative embodiment, event parser 142 processes the event using the retrieved rule to generate a partial configuration.

After all the local resources of rules have been exhausted in parsing the event, the generated configuration/partial configuration or the retrieved local rules will be checked by operation controller 141 to determine whether locally retrieved rules are sufficient to convert the event, i.e., map portions of the standardized format. Two criteria may be used for the determination: (1) the number of portions of the standardized format that can be mapped (filled) by applying the locally retrieved rules, and (2) the amount of information successfully extracted from the original event by the configuration/partial configuration. However, it should be appreciated that the scope of the invention is not limited by any specific criteria in making the determination. In the case that operation controller 141 determines that locally retrieved rules are sufficient to convert the event, the locally retrieved rules are applied to convert the event and the operation of event processor 132 ends with the current event. In the case that operation controller 141 determines that locally retrieved rules are not sufficient to convert the event, e.g., locally retrieved rules are not sufficient to map a portion of the standardized format, operation of event processor 132 proceed to step S2.

Next in step S2, peer rule importer 146 communicates the original event to a peer processing node 12 (FIG. 1) for the peer processing node 12 to provide proper rules to convert the original event, i.e., map the portions. Peer processing nodes 12 may include all processing nodes 12 or may include a portion of processing nodes 12. Any method may be used to establish a peer group of processing nodes 12 so that a responsible processing node 12 within the peer group may import rules from other processing nodes within the peer group in processing an event. According to an embodiment, the event processing history of processing nodes 12 may be used as the basis for establishing a peer processing group, i.e., selecting peer processing nodes 12. For example, if a group of processing nodes 12 all have experience processing a certain type of event, these processing nodes may form a peer group regarding that specific type of event. According to an embodiment, peer rule importer 146 only communicates the original event so that a peer processing node may provide as many rules as possible. According to an alternative embodiment, peer rule importer 146 further communicates at least one of the identifications of the portions that cannot be mapped with the locally retrieved rules and the locally retrieved rules to peer processing nodes. As a consequence, processing resources may be saved in peer processing nodes 12 providing rules and responsible processing node 12 selecting the provided rules.

In receipt of an original event communicated from a responsible processing node, rule exporter 152 of a peer processing node searches and retrieves rules for processing the original event in the respective rule bank 32 (FIG. 1). If the peer processing node 12 retrieves rules deemed (by the peer processing node 12) as suitable for processing the original event, such rules will be communicated back to the responsible processing node 12. As described before, a peer processing node 12 may provide all rules it has for processing the original event, or may provide only the rules that are requested by the responsible processing node 12, e.g., by providing identifications of portions not mapped.

In receipt of a response of peer rule from peer processing nodes 12, peer ranker 148 ranks/evaluates the response to select peer rules to be used in processing the original event. Any standard may be used in the evaluation, and all are included in the scope of the invention. According to an embodiment, the evaluation/ranking may be made on a case-by-case basis, where peer ranker 148 ranks a response of peer rules from a peer processing node 12 based on the total number of useful nodes communicated from the peer processing node. If a peer processing node 12 provides more useful rules (rules that the responsible processing node 12 does not have locally) than another peer processing node 12, the rules provided by the former peer processing node 12 will be selected/accepted before rules from the latter peer processing node 12. According to an alternative embodiment, the evaluation/ranking may be made based on a confidence level of peer processing nodes 12 recognized by the responsible processing node 12. Any standard may be used to determine a confidence level of a peer processing node 12, and all are included in the invention. According to an embodiment, the confidence level of a peer processing node 12 may be determined based on a history of cooperation in event processing, e.g., requesting and providing peer rules, between the responsible processing node and the peer processing node 12. For example, if historical data shows that a responsible processing node 12 and a peer processing node 12 helped each other satisfactorily and frequently, the responsible processing node may rely more on that specific peer processing node 12 and may rank that peer processing node higher in confidence level. As a consequence, a peer rule communicated from a peer processing node with a higher confidence level will be accepted by peer rule importer 146 of the responsible processing node 12 before a peer rule from a peer processing node 12 with a lower confidence level.

According to an embodiment, the confidence level of a peer processing node 12 may be reciprocally recognized by the peer processing node 12. Specifically, if a responsible processing node 12 (e.g., 12a) treats a peer processing node 12 (e.g., 12b) (FIG. 1) with a higher confidence level, the peer processing node 12b may also treat the responsible processing node 12a with a higher confidence level. For example, when processing node 12b is functioning as a responsible processing node, it will also accept peer rules from processing node 12a before accepting peer rules from other peer processing nodes 12. In addition, in the case that peer processing node 12b receives multiple requests for peer rules from multiple responsible processing nodes 12, peer processing node 12b may assign a priority to the request from responsible processing node 12a and may retrieve peer rules for processing node 12a first.

Next in step S3, rule set combiner 150 combines the selected peer rules and the locally retrieved rule to generate a rule set to convert the original event into the standardized format. After the rule set is generated or after the generated rule set is applied to generate a configuration/partial configuration, operation controller 141 may check whether the generated rule set is sufficient to convert the original event. According to an embodiment, the checking may be substantially the same as the one performed in step S1 regarding the locally retrieved rules. If it is determined that the generated rule set is not sufficient to convert the original event, operation controller 141 further checks whether all resources of local rule and peer rules have been exhausted. If the resources of local rules and peer rules are not exhausted, operation controller 141 controls the operation to go back to step S2 and peer rule importer 146 re-selects peer rules for rule set combiner 150 to re-generate a rule set. This procedure iterates until it is determined that the generated rule set is sufficient or that all possible resources of local rules and peer rules are exhausted. In either case, the available rule set will be applied to convert the original event (even partially) and obtain as much information as possible. Then the operation of event processor 132 ends with the current original event and processing experience (PE) publisher 154 of the responsible processing node 12 may communicate the experience of processing this specific original event to all processing nodes 12 to share. The experience may include the effectiveness/efficiency of every rules ever tried in the processing.

According to an alternative embodiment, after step S1, peer rule importer 146 of the responsible processing node 12 may also choose to/offer to transfer the original event to a peer processing node 12 for the peer processing node 12 to convert the original event. Reasons for such transfer may include too few rules locally retrieved and/or heavy workload of the responsible processing node 12. According to an embodiment, when transferring/offering to transfer the original event to a peer processing node 12, the responsible processing node 12 also communicates all the rules locally retrieved in step S1 for the peer processing node to use. If the peer processing node 12 accepts the original event, it becomes the new responsible processing node 12, and the original responsible processing node becomes a peer processing node, as described above.

4. Conclusion

While shown and described herein as a method and system for converting an event into a standardized format by a processing node e, it is understood that the invention further provides various alternative embodiments. For example, in an embodiment, the invention provides a program product stored on a computer-readable medium, which when executed, enables a computer infrastructure to convert an event into a standardized format by a processing node. To this extent, the computer-readable medium includes program code, such as event processor 132 (FIG. 2), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 120 (FIG. 2) and/or database 128 (FIG. 2), and/or as a data signal traveling over a network (e.g., during a wired/wireless electronic distribution of the program product).

In another embodiment, the invention provides a method of generating a system for converting an event into a standardized format by a processing node. In this case, a computer infrastructure, such as computer system 100 (FIG. 2), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing system 100 (FIG. 2), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising supported, and/or fee basis. That is, a service provider could offer to convert an event into a standardized format by a processing node as described herein. In this case, the service provider can manage (e.g., create, maintain, support, etc.) a computer infrastructure, such as computer system 100 (FIG. 2), that performs the process described herein for one or more customers and communicates the results to the one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of converting an original event into a standardized format, the method comprising:
   receiving, by a responsible processing node, the original event;
   mapping one portion original event to the standardized format based upon a rule retrieved locally within the responsible processing node;
   identifying a second portion of the original event not capable of being mapped based upon rules retrieved locally within the responsible processing node;
   upon identifying the second portion, communicating the original event to a peer processing node;
   receiving, by the responsible processing node, a rule, not found locally within the responsible processing node, from the peer processing node based upon the original event; and
   converting the event into the standardized format based upon a combination of the rule retrieved locally and the rule received from the peer processing node.

2. The method of claim 1, wherein
   at least one of an identification of the second portion and the rule retrieved locally is communicated to the peer processing node.

3. The method of claim 1, wherein
the second portion is mapped to the standardized formation based upon the rule received from the peer processing node.

4. The method of claim 1, further comprising
ranking a response from the peer processing node, the response including the rule received from the peer processing node.

5. The method of claim 4, wherein
the ranking is based upon a confidence level of the peer processing node recognized by the responsible processing node.

6. The method of claim 5, wherein
a rule provided by a peer processing node with a higher confidence level is accepted by the responsible processing node before a rule provided by a peer processing node with a lower confidence level.

7. The method of claim 1, further comprising
communicating the rule retrieved locally to the peer processing node; and
transferring the original event to the peer processing node for processing by the peer processing node.

8. The method of claim 1, wherein
the peer processing node is selected based upon a history of event processing by the peer processing node.

9. A computer program product including a computer readable storage medium for computer readable instructions for converting an original event into a standardized format, the computer readable instructions, when executed on a responsible processing node, cause the responsible processing node to perform the operations of:
receiving the original event;
mapping one portion original event to the standardized format based upon a rule retrieved locally within the responsible processing node;
identifying a second portion of the original event not capable of being mapped based upon rules retrieved locally within the responsible processing node;
upon identifying the second portion, communicating the original event to a peer processing node;
receiving, by the responsible processing node, a rule, not found locally within the responsible processing node, from the peer processing node based upon the original event; and
converting the event into the standardized format based upon a combination of the rule retrieved locally and the rule received from the peer processing node.

10. The computer program product of claim 9, wherein
at least one of an identification of the second portion and the rule retrieved locally is communicated to the peer processing node.

11. The computer program product of claim 9, wherein
the second portion is mapped to the standardized formation based upon the rule received from the peer processing node.

12. The computer program product of claim 9, further comprising
ranking a response from the peer processing node, the response including the rule received from the peer processing node.

13. The computer program product of claim 12, wherein
the ranking is based upon a confidence level of the peer processing node recognized by the responsible processing node.

14. The computer program product of claim 13, wherein
a rule provided by a peer processing node with a higher confidence level is accepted by the responsible processing node before a rule provided by a peer processing node with a lower confidence level.

15. The computer program product of claim 9, further comprising
communicating the rule retrieved locally to the peer processing node; and
transferring the original event to the peer processing node for processing by the peer processing node.

16. The computer program product of claim 9, wherein
the peer processing node is selected based upon a history of event processing by the peer processing node.

17. A responsible processing node for converting an original event into a standardized format, comprising:
a memory; and
a processor connected to the memory and configured to perform the operations of:
receiving the original event;
mapping one portion original event to the standardized format based upon a rule retrieved locally within the responsible processing node;
identifying a second portion of the original event not capable of being mapped based upon rules retrieved locally within the responsible processing node;
upon identifying the second portion, communicating the original event to a peer processing node;
receiving a rule, not found locally within the responsible processing node, from the peer processing node based upon the original event; and
converting the event into the standardized format based upon a combination of the rule retrieved locally and the rule received from the peer processing node.

18. The responsible processing node of claim 17, wherein
at least one of an identification of the second portion and the rule retrieved locally is communicated to the peer processing node.

19. The responsible processing node of claim 17, wherein
the second portion is mapped to the standardized formation based upon the rule received from the peer processing node.

20. The responsible processing node of claim 17, wherein
the processor is further configured to perform the operation of
ranking a response from the peer processing node, the response including the rule received from the peer processing node.

21. The responsible processing node of claim 20, wherein
the ranking is based upon a confidence level of the peer processing node recognized by the responsible processing node.

22. The responsible processing node of claim 21, wherein
a rule provided by a peer processing node with a higher confidence level is accepted by the responsible processing node before a rule provided by a peer processing node with a lower confidence level.

23. The responsible processing node of claim 17, wherein
the processor is further configured to perform the operation of
communicating the rule retrieved locally to the peer processing node; and
transferring the original event to the peer processing node for processing by the peer processing node.

24. The responsible processing node of claim 17, wherein
the peer processing node is selected based upon a history of event processing by the peer processing node.

* * * * *